United States Patent
Van Wijngaarden et al.

(10) Patent No.: US 7,137,501 B2
(45) Date of Patent: Nov. 21, 2006

(54) FEEDING APPARATUS FOR PRODUCTS SUCH AS FRUITS

(75) Inventors: Erik Van Wijngaarden, Hengelo (NL); Wouter Van Den Berg, Voorburg (NL)

(73) Assignee: FPS Food Processing Systems B.V. (NL)

( * ) Notice: Subject to any disclaimer, the term of this patent is extended or adjusted under 35 U.S.C. 154(b) by 0 days.

(21) Appl. No.: 10/998,042

(22) Filed: Nov. 29, 2004

(65) Prior Publication Data

US 2005/0133344 A1   Jun. 23, 2005

(30) Foreign Application Priority Data

Dec. 1, 2003   (EP) .................................. 03078789

(51) Int. Cl.
*B65G 17/32*   (2006.01)
(52) U.S. Cl. ....................................... 198/384; 198/387
(58) Field of Classification Search ................ 198/384, 198/386, 387, 436, 453, 454, 606, 626.1
See application file for complete search history.

(56) References Cited

U.S. PATENT DOCUMENTS

| | | | | |
|---|---|---|---|---|
| 4,353,455 A | * | 10/1982 | Mumma et al. | 198/384 |
| 4,730,719 A | * | 3/1988 | Brown et al. | 198/387 |
| 5,052,543 A | * | 10/1991 | Hagan | 198/387 |
| 6,415,902 B1 | * | 7/2002 | Vis et al. | 198/384 |

FOREIGN PATENT DOCUMENTS

| | | | | |
|---|---|---|---|---|
| GB | 1276361 | | 6/1972 | |
| JP | 61-75726 | * | 4/1986 | 198/384 |
| JP | 61-111221 | | 5/1986 | |
| JP | 61090914 | | 5/1986 | |

OTHER PUBLICATIONS

CompacSLS, 2001.

* cited by examiner

*Primary Examiner*—James R. Bidwell
(74) *Attorney, Agent, or Firm*—Stites & Harbison PLLC; Marvin Petry

(57) ABSTRACT

An apparatus for transferring products, such as fruit, onto, and supplying the same to, a conveyor, preferably a roller conveyor. The apparatus is provided with two flat endless conveyor belts positioned obliquely relative to a vertical plane, continuous in the conveying direction, functioning as a V-channel. The endless conveyor belts first extend substantially parallel to the conveyor in the conveying direction, wherein from a well-defined location, the endless conveyor belts bear off the conveyor and continue at different angles relative to the conveying direction, with the conveyor belts diverging mutually. The apparatus accommodates a stream of food products, such as fruit, with greatly varying sizes, to be transferred gradually and in the proper sequential order onto the conveyor, thereby considerably reducing injuries to the food product during transfer.

11 Claims, 2 Drawing Sheets

FEEDING APPARATUS FOR PRODUCTS SUCH AS FRUITS

FIELD OF THE INVENTION

The present invention relates to an apparatus for supplying to, and transferring products onto, a roller conveyor.

BACKGROUND OF THE INVENTION

A prior feeding apparatus is described in JP61111221, which describes the conveyance of products such as fruit situated in file. With a first conveyor, randomly arranged products are supplied to a second conveyor. This second conveyor consists of two brushes rotating in opposite senses, which provide for a continuous movement of the products in the conveying direction. As indicated in the drawing, in order to transfer the products situated behind and against each other to a roller conveyor, the products are gradually supplied to and onto the rollers by means of an intermediate section. This intermediate section is formed by two flat continuous conveyor belts, positioned obliquely relative to a vertical plane, which, directly after the brushes, function either as a V-channel (FIG. 4) or, starting as a V-channel, diverge to some extent (FIG. 1). At an appropriate speed of the conveyor belts, the products will, respectively, end up on the rollers with some spread, or not only continue in the conveying direction but moreover move down gradually between the belts.

Ideally, the sequential order effected will be preserved. However, when products such as fruits, nearly always having a greater or lesser spread in size, are being conveyed, their falling from between the flat belts will proceed less uniformly than expected. In fact, the sequential order may even be disturbed, or fruits may end up side by side between two rollers, thus forming 'doubles'.

SUMMARY OF THE INVENTION

In order to avoid the identified problem in the art as much as possible, the apparatus according to one embodiment of the present invention is characterized in that from a well-defined location, the endless conveyor belts continue at different angles relative to the conveying direction, with the conveyor belts diverging mutually.

What is advantageously achieved with this arrangement is that the products are fed gradually onto the conveyor. Precisely by making the angles unequal, the products will not only be gradually positioned on the conveyor, but at the same time also lean against the conveyor belt which, of the two conveyor belts, deviates the least from the continuous conveying direction. What is furthermore achieved in this way is that the sequential order which the products assume between the two conveyor belts is preserved more than before. As a result, both the singulation of the products and the filling of the conveyor will be improved. Moreover, in the conveyance of fruits, fewer injuries will occur as a result of the reduction of the height of drop.

Further embodiments of the apparatus according to the invention are characterized in that one of the conveyor belts proceeds straight on, and, next, that the angle for one conveyor belt has a value between 0° and 15° and for the other conveyor belt has a greater value between 0° and 30°.

With this choice of possibilities, which can also be seen as setting possibilities, products of all sizes will preserve their sequential order in a suitable manner and also can be fed onto the conveyor smoothly.

Other embodiments of the apparatus according to the invention are characterized in that the above-mentioned conveyor belt proceeding straight on deviates, at a position situated further downstream, from the conveying direction at a second angle, more particularly that the angles at which the two conveyor belts deviate from the conveying direction are equal, or also that the above-mentioned second angle is greater than the angle at which the opposite conveyor belt deviates, from a position situated upstream, from the conveying direction at a first angle, particularly the first angle having a value between 0° and 15° and the second angle having a value between 0° and 30°.

What is achieved with great advantage by the use of conveyor belts deviating one after the other, is that on the one hand the sequential order is preserved and, on the other, in particular where the second deviation begins, the transfer onto the conveyor is further improved, it being possible for this transfer to be done still more gradually.

In yet another embodiment of the present invention, the apparatus is characterized in that the speed of each conveyor belt is separately settable. Such a feature is known per se in this technical field, for instance as described in a brochure of the firm COMPAC, "CompacSLS", 2001. What is achieved in that way is that the products are not only translated, i.e. conveyed in the conveying direction, but also rotated, thereby enabling the products that are not properly disposed in line to rotate away from each other. By presently combining this feature with the above-mentioned features according to the present invention, advantageously, a further improved singulation result and filling result are obtained, and fewer injuries occur during fruit transfer.

BRIEF DESCRIPTION OF THE DRAWINGS

Further details of the apparatus according to the present invention will be discussed with reference to a drawing, in which.

DETAILED DESCRIPTION

In the different figures, the same parts and aspects are numbered and designated in the same way.

Figure 1:
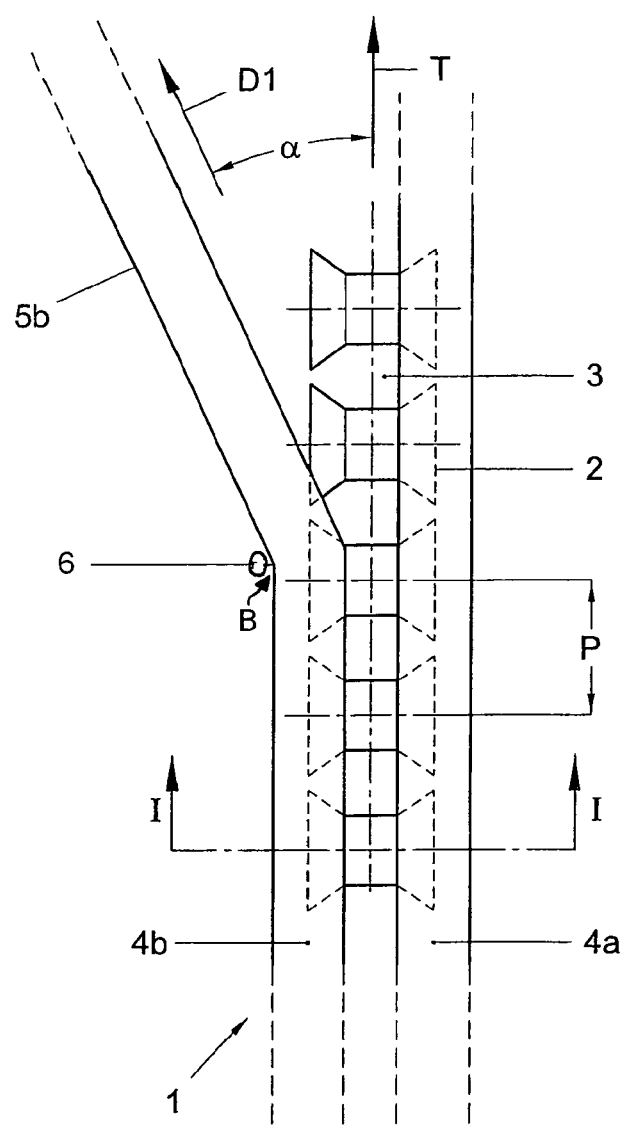
FIG. 1 shows a top plan view of a first exemplary embodiment.

In FIG. 1, in top plan view, an endless conveyor 1 moves in conveying direction T. In the exemplary embodiment drawn, the conveyor is a roller conveyor with rollers 2, more particularly hourglass-shaped rollers, defining between them, viewed in the conveying direction, positions or intermediate spaces 3 where products (not shown) are situated and supported by these rollers 2. The distance p between the rollers 2, calculated between dotted lines which represent the axis positions, is the so-called pitch. For a conveyor, this distance is generally not settable, but is highly determinative of its capacity, more particularly the filling degree and output (number of products per second). Such endless conveyors, being roller conveyors in the present case, are very well known in the field of conveyance and sorting, in particular fruit sorting.

Furthermore, in FIG. 1, two endless conveyor belts 4a,b are represented, positioned obliquely relative to a vertical plane and, as represented, at least for a part above the rollers 2. These conveyor belts 4a,b jointly constitute a V-channel. This V-channel proceeds generally horizontally. It will be clear to those skilled in the art that slightly downwardly inclined, and hence gradually downwardly slanting, V-channels are also possible.

In the conveying direction T, at B, a kink or bend is provided in the left-hand (as viewed from above) conveyor belt 4b. From bend B, this conveyor belt, indicated after the bend as bend part 5b, continues its path in direction D1 at an angle α. It will be clear to those skilled in the art that the conveyors mentioned are driven in a conventional manner by driven gears or driven rollers. Furthermore, it will be clear that in a suitable manner the speeds can all be set, thereby suitably spreading the products in the continuous direction, in particular at intermediate distances matching the above-mentioned pitch p.

Figure 2:
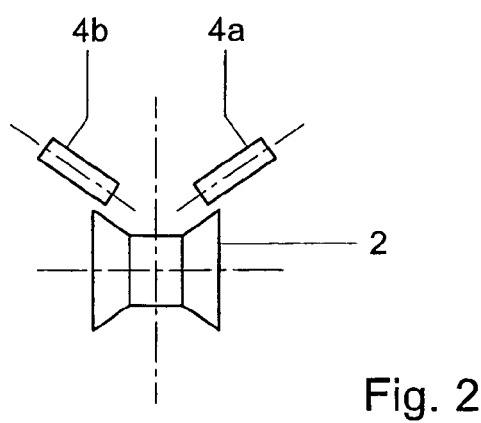
FIG. 2 shows a cross section along line I—I in FIG. 1.

In FIG. 2. a cross section along I—I in FIG. 1 is represented. It is clearly indicated how the conveyor belts 4a,b are disposed above the rollers 2. Further, the dotted lines indicate the axis directions for, for instance, the driving rollers for these conveyor belts.

Figure 5:
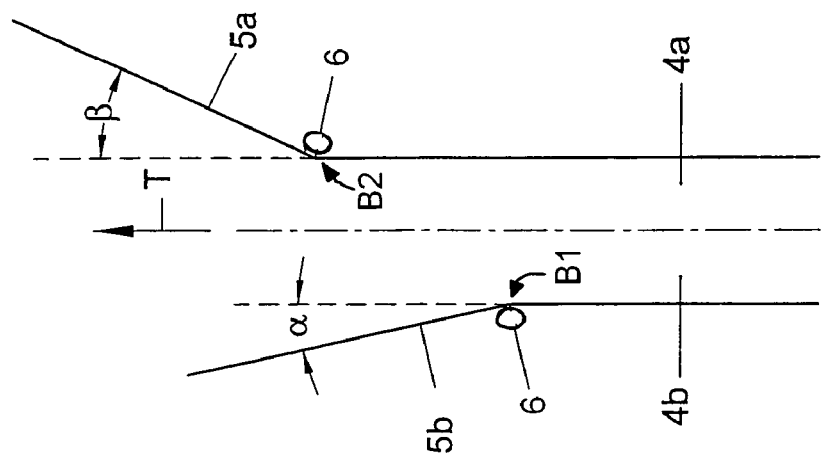
FIGS. 3, 4 and 5 schematically show top plan views of further exemplary embodiments.
Figure 4:
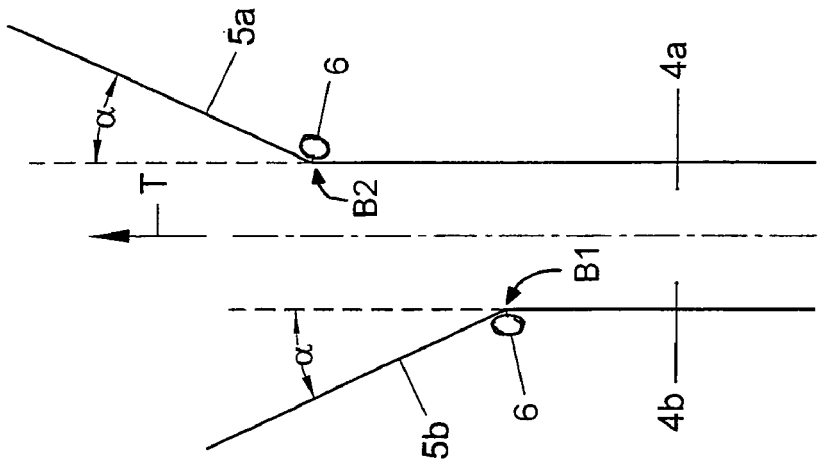
Figure 3:
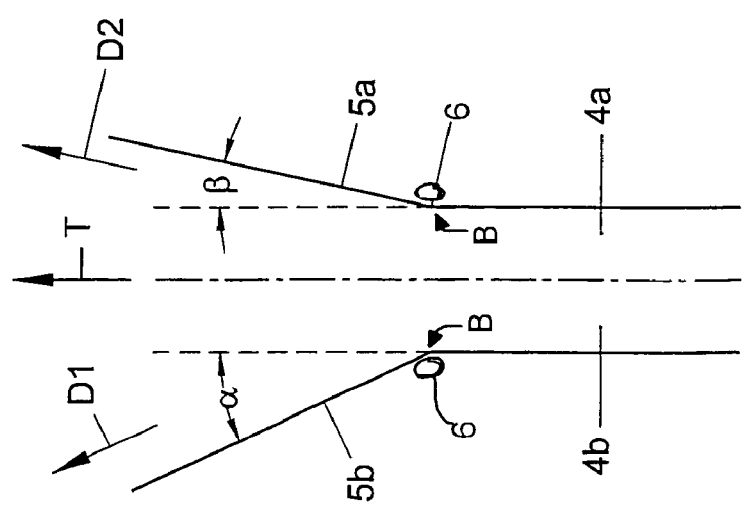

In FIGS. 3, 4 and 5, further embodiments according to the invention are shown schematically.

In FIG. 3, at the same bend location B, the two belts diverge as bend parts 5a,b in different directions D1,2 at angles α, β relative to the conveying direction T, with β<α.

In FIG. 4, two bend locations B1,2 are indicated, with B2 downstream of B1. In this exemplary embodiment, the bend parts 5a,b diverge at the same angle α with respect to the conveying direction T. An advantage of this is that during assembly more similar parts can be used.

In FIG. 5, compared with FIG. 4, in addition the angles are different, now with α<β.

For the exemplary embodiments where two bends B1,2 are used, the distance between B1 and B2 will be suitably chosen. Besides the fact that this distance may be settable, it will generally be chosen such, for instance a few pitches p long, that, at the set speeds, angles and product sizes, singulation and filling of the conveyor take place optimally and with as few injuries as possible.

In general, the conveyor, as well as the continuous parts of the V-channel preceding the diverging parts thereof, will extend substantially is horizontally. By contrast, after the bend, via an inclined portion, a gradual transition from a V-channel to a conveyor will be set.

Any appropriate method known to one of ordinary skill in the art can be used to form the bend in the conveyor belts making up the V-channel. It will be clear to those skilled in the art that such a bend is preferably formed by a freely rotating roller 6 over which the conveyor belt, which is also an endless belt itself, is guided. More particularly, the direction of the axis of the roller relative to the continuous direction of the conveyor determines the direction of the inclination given to the conveyor belt. In that case, the three possibilities are those whereby the edges continue approximately horizontally but the belt deviates as schematically indicated above, or the belt inclines downwards to some extent, or even proceeds to run upwards.

For the case where the belt runs slightly downwards, it has been found that after a first section of V-channel according to the prior art with the positioning in file more or less completed, each product will briefly accelerate in the second downwardly inclined section because of the inclination. At the same time, a distance is thereby created between the products situated behind each other. What is advantageously achieved by suitably choosing the speeds relative to the speed of the conveyor 1 is that the products in a good approximation possess an intermediate distance which is equal to the pitch of the conveying positions of the conveyor 1. A further great advantage is that precisely by virtue of this inclination, the products will gradually assume their place in these positions.

It has further been found that a suitable inclination is one where adjacent the bend the height of the belts of the V-channel is at least three product heights, with the deviation angles chosen in the ranges as indicated above. With apparatuses known per se, these heights are settable, while further the earlier-mentioned horizontal position can be fine-adjusted in order to make in particular the transition to the conveyor still smoother.

It will be clear to those skilled in the art that small deviations from and differences from the examples as described above also fall within the scope of the claims. For instance, the directions D1,2 can be curved, and the bend parts may include further bends. Moreover, the orientation relative to the above-mentioned vertical plane may be slowly rotated to thereby transfer the products onto the conveyor still more smoothly.

Further small modifications and variants on the above-mentioned exemplary embodiments are to be understood to fall within the scope of protection of the appended claims.

The invention claimed is:

1. An apparatus for supplying to and transferring products onto a conveyor, said apparatus comprising:
   a roller conveyor having intermediate spaces between successive rollers of the roller conveyor, the spaces forming nests for a product, wherein, viewed in the conveying direction, preceding the conveyor;
   two flat endless conveyor belts positioned obliquely relative to a vertical plane, continuous in the conveying direction to define a V-shaped channel, the endless conveyor belts having an upstream part which extends substantially parallel to the conveyor in the conveying direction, wherein from a well-defined location, a downstream part of at least one of the endless conveyor belts deviates from the conveyor and continues at a different angle relative to the conveying direction, the conveyor belts thereby defining a diverging V-shaped channel.

2. The apparatus according to claim 1, wherein one of the conveyor belts, over its entire length, extends parallel to the conveyor.

3. The apparatus according to claim 1, wherein said angle for one conveyor belt has a value between 0° and 15° and said angle for the other conveyor belt has greater value between 0° and 30°.

4. The apparatus according to claim 2, wherein a first one of said conveyor belts deviates with a first angle from the conveyor from a first well-defined location, and wherein a second one of said conveyor belts deviates with a second angle from the conveyor from a second well-defined location, the second well-defined location being downstream of the first well-defined location.

5. The apparatus according to claim 4, wherein the first and second angles are equal.

6. The apparatus according to claim 4, wherein said second angle is greater than the first angle.

7. The apparatus according to claim 6, wherein the first angle has a value between 0° and 15° and the second angle has a value between 0° and 30°.

8. The apparatus according to claim 1, wherein the speed of each conveyor belt is separately settable.

9. The apparatus according to claim 1, wherein at said at least one well-defined locations a bend present in the conveyor belt at the location of divergence, at which location the conveyor belts are guided over a freely rotating roller.

10. The apparatus according to claim 9, wherein the bend is provided at a height of at least three product heights above said conveyor, while the diverging conveyor belts, having an inclined portion after the bend, thereby providing a downward guidance to the products.

11. The apparatus of claim 1, wherein the roller conveyor comprises hourglass-shaped rollers.

* * * * *